(12) United States Patent
Lam

(10) Patent No.: US 12,437,103 B2
(45) Date of Patent: Oct. 7, 2025

(54) METHODS AND SYSTEMS FOR CONTROL OF PERSONAL DATA AND TRANSFERABILITY

(71) Applicant: DISH Wireless L.L.C., Englewood, CO (US)

(72) Inventor: Phap Lam, Colfax, IA (US)

(73) Assignee: DISH Wireless L.L.C., Englewood, CO (US)

( * ) Notice: Subject to any disclaimer, the term of this patent is extended or adjusted under 35 U.S.C. 154(b) by 247 days.

(21) Appl. No.: 17/481,153

(22) Filed: Sep. 21, 2021

(65) Prior Publication Data

US 2023/0091016 A1  Mar. 23, 2023

(51) Int. Cl.
G06F 21/62 (2013.01)
G06F 21/31 (2013.01)
G06F 21/60 (2013.01)

(52) U.S. Cl.
CPC .......... G06F 21/6245 (2013.01); G06F 21/31 (2013.01); G06F 21/604 (2013.01); G06F 21/6227 (2013.01)

(58) Field of Classification Search
CPC .... G06F 21/6245; G06F 21/31; G06F 21/604; G06F 21/6227; G06F 21/10
See application file for complete search history.

(56) References Cited

U.S. PATENT DOCUMENTS

| | | | | |
|---|---|---|---|---|
| 8,589,292 | B1* | 11/2013 | Huberman | G06Q 30/06 705/37 |
| 8,667,487 | B1* | 3/2014 | Boodman | G06F 16/9577 717/124 |
| 10,832,299 | B1* | 11/2020 | Clauss | G06Q 30/0611 |
| 11,657,180 | B1* | 5/2023 | Mehta | G06F 3/0482 726/2 |
| 2009/0175442 | A1* | 7/2009 | Feng | H04L 9/3257 380/28 |
| 2011/0295694 | A1* | 12/2011 | Coggeshall | G06Q 30/02 705/14.69 |
| 2011/0313915 | A1* | 12/2011 | Tang | G06Q 10/101 705/39 |

(Continued)

OTHER PUBLICATIONS

Brave Software, Inc., Brave Browser, https://brave.com, homepage screen grab, San Francisco, CA, Sep. 21, 2021, 12 pgs.

*Primary Examiner* — Robert B Leung
(74) *Attorney, Agent, or Firm* — Perkins Coie LLP

(57) ABSTRACT

Techniques are provided that allow a user device to connect to a web browser for viewing one or more websites. The web browser is communicably connected to a platform that takes the data from the user's online behavior and generates a personal data package of the user. In other aspects, the web browser has added the capabilities of generating the personal data package of the user as an add-on product. In other aspects, an individual or organization is also communicably connected to the platform or add-on product for accessing the user's personal data package. After accessing the user's personal data package, the individual or organization is able to pay the user via a financial institution, which is communicably connected to the platform or add-on product. In other aspects, the user data is stored in a storage on the platform and such data is available to one or more third-party subscribers.

18 Claims, 3 Drawing Sheets

(56) References Cited

U.S. PATENT DOCUMENTS

| | | | |
|---|---|---|---|
| 2012/0290401 A1* | 11/2012 | Neven | G06V 20/20 |
| | | | 382/103 |
| 2014/0344015 A1* | 11/2014 | Puertolas-Montanes | |
| | | | G06Q 30/0201 |
| | | | 705/7.29 |
| 2021/0342472 A1* | 11/2021 | Forman | G06F 21/31 |
| 2021/0365574 A1* | 11/2021 | Blaikie, III | H04L 9/088 |
| 2022/0036377 A1* | 2/2022 | Seibel | G06Q 30/08 |
| 2023/0237548 A1* | 7/2023 | Nam | G06Q 30/0273 |
| | | | 705/26.25 |

\* cited by examiner

METHODS AND SYSTEMS FOR CONTROL OF PERSONAL DATA AND TRANSFERABILITY

BACKGROUND

Presently, users opt-in to a multitude of different data marts such as Facebook (Facebook, Inc., Menlo Park, CA) or Google (Alphabet Inc., Mountain View, CA). Typically, users implicitly approve to give away their data, including personal data, to such data marts. Then, the data marts sell the users' data to third parties, such as advertisers, which are then paying the companies, who own or control the data marts, for the users' data. In the advertising industry, the purchased users' data then are processed to generate targeted advertisements ("ads"). Currently, there is no mechanism available for enabling the users to have and maintain control of their personal data.

The Brave browser (Brave Software, Inc., San Francisco, CA) is a privacy-focused browser that automatically blocks online advertisements and website trackers in its default settings. Further, Brave employs a "Basic Attention Token" (BAT) open-source, decentralized ad exchange platform. Users of the Brave browser can choose to earn BAT by viewing advertisements that are displayed on their computing devices. Advertising campaigns are matched with users by inference from their browsing history; this targeting is carried out locally, with no transmission of personal data outside the browser, removing the need for third-party tracking.

DETAILED DESCRIPTION

Figure 1:
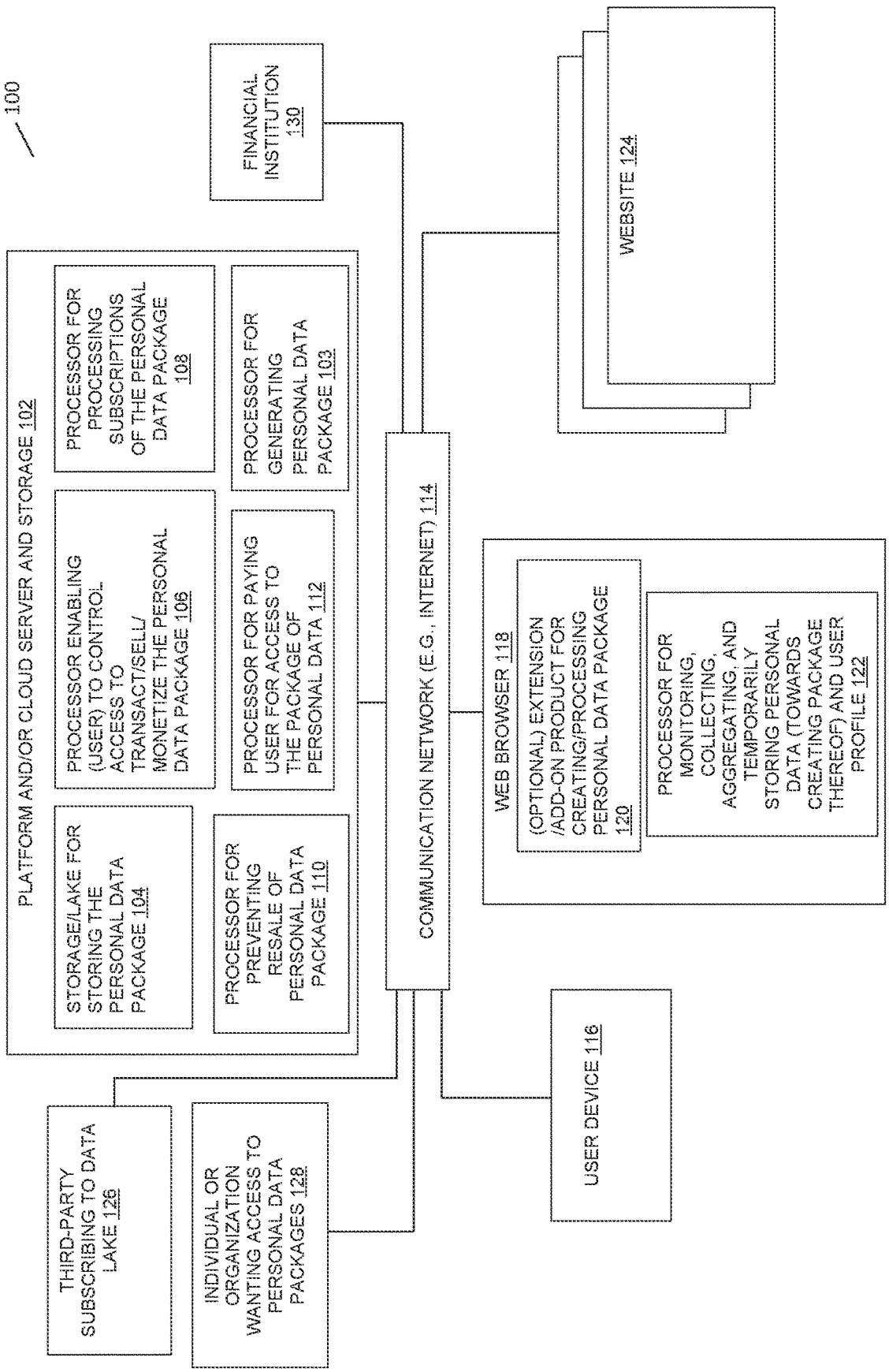
FIG. 1 is a schematic diagram of a high-level architecture of the network environment, in accordance with an embodiment.

Systems and methods (also referred to herein as the "system") are provided that allow a user to give as much access as possible or necessary to their personal data. The innovation creates a data package of their personal data that the user controls. In this way, the innovation flips the current model of free access to the user's online data, such as for example the online provider selling the user's personal and private data to advertising companies, while the user is excluded from such transactions. Systems and methods are configured so that the user controls access to their personal and/or private online data in the form of the personal data package. In an embodiment, the systems and methods are configured to allow the user to transfer their personal data via the personal data package. Further, the systems and methods are configured to allow the user to transact the personal data package, such as for example by opening up the data for a subscription. For example, the system is configured to allow the subscriber to have access to particular types of data. For instance, the subscriber may have access to the user's web data for a predetermined amount of time (e.g., 20-30 days). Other examples of the particular types of data may include but are not limited to being restricted to advertisement data, the location of the user, the web traffic of the user, and eye tracking data.

In another embodiment, the system is configured to allow the subscriber, such as a third-party company, to a data lake that stores many personal data packages from many users. In one embodiment, many companies can subscribe to the data lake at a standard rate. In another embodiment, companies can bid for a specific rate and/or a specific amount of access and only one company wins the access. In another embodiment, the system is configured to offer fluctuating pricing for the data.

In one embodiment, the personal data package is processed on a network-accessible platform. In another embodiment, the personal data package is processed as or via an add-on product that rides on top of web applications.

More specifically, techniques are provided that allow a user device to connect to a web browser for viewing one or more websites. The web browser is communicably connected to a platform that takes the data from the user's online behavior and generates a personal data package of the user. In other aspects, the web browser has added the capabilities of generating the personal data package of the user as an add-on product. In other aspects, an individual or organization is also communicably connected to the platform or add-on product for accessing the user's personal data package. After accessing the user's personal data package, the individual or organization is able to pay the user via a financial institution, which is communicably connected to the platform or add-on product. In other aspects, the user data is stored in a storage on the platform and such data is available to one or more third-party subscribers.

An embodiment can be understood with reference to FIG. 1, a schematic diagram of a high-level architecture of the network environment 100. A user device 116 is communicably connected, via a communication network 114, to a web browser 118 for the purpose of viewing one or more websites 124. The web browser 118 is communicably connected, via the communication network 114, to a platform and/or cloud server and storage 102 that takes the data from the user's online behavior and generates a personal data package of the user via a processor for generating the personal data package 103. In another embodiment, the web browser 118 has added, via communication network 114, the capabilities of generating the personal data package of the user as extension or add-on product for creating and/or processing personal data package 120. The web browser 118 includes a processor for monitoring, collecting, aggregating, and temporarily storing personal data (towards creating package thereof) and user profile 122. An individual or organization wanting access to personal data packages 128 is also communicably connected, via communication network 114, to the platform 102 or add-on product 120 for the purposes of accessing the user's personal data package. After accessing the user's personal data package, the individual or organization 128 is able to pay the user 116 via a processor for paying user for access to the package of personal data 112 and via a financial institution 130, which is communicably connected, via a communication network 114, to the platform 102 or add-on product 120. In an embodiment, the user data is stored in a storage, such as a data lake 104, on the platform 102 and such data is available to one or more third-party subscribers to the data lake 126. The platform 102 may include a processor for preventing the resale of the personal data package 110, a processor for processing subscriptions of the personal data package 108, and a processor enabling (user) to control access to/transact/sell/monetize the personal data package 106.

In an embodiment, the client device 116 is a computing device such as a laptop, tablet, desktop personal computer, and smartphone, each of which can support a client application. The client device 116 can be a device that supports a web browser (e.g., 118) that connects to a server, such as platform 102. In an embodiment, user device 116 accesses one or more websites 124 via web browser 118, or via an add-on product 120. In an embodiment, the web browser is communicably connected, via communication network 114, to the platform 102, so that the platform processes the user's browsing data and other browsing-related information, such as eye tracking, into a personal data package of the user. The user can allow access to this generated personal data package to a third-party and receive payment for such access, for example, via the financial institution. In another embodiment, this process, from the user browsing to receiving payment for access to their browsing and browsing-related data, is performed by the add-on product 120.

In an embodiment, the communications network 114 is illustrated as a generic communication system. In one embodiment, the communication network 114 comprises the internet. In one embodiment, the communication network 114 may perform other auxiliary operations, such as authentication, rate limiting, and so on. Accordingly, interfaces may be a modem or other type of internet communication device. Alternatively, the communication network 108 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, interfaces are configured to establish a communication link or the like with the communication network 114 on an as-needed basis, and are configured to communicate over the particular type of communication network 114 to which it is coupled.

In an embodiment, website 124, which can represent more than one website depending on the context, is illustrated as a generic website. In an embodiment, user device 116 views website 124 by using web browser 118.

In an embodiment, financial institution 130 is illustrated as a generic financial institution. In an embodiment, the financial institution 130 is associated with the user of user device 116 and for whom the personal data package is generated. After one or more third party individuals or organizations (e.g., 126 and 128) access the user's personal data package (e.g., as stored in 104), the platform 102 processes the accessing and generates a payment amount owed to the user (e.g., by processor enabling user to control access to transact and/or sell and/or monetize the personal data package 106). In an embodiment, the platform 102 is communicably connected to the user's account in financial institution 130 and automatically places a corresponding fund amount into the user's account. In another embodiment, such processor 106 causes the third party individual or organization to ensure that the computed payment amount will be entered, by them, into the user's account in the financial institution 130. For example, the platform 102 may bill such third party individual or organization, such as by sending a physical letter, email, SMS message, or other means of communication. In another embodiment, the third party individual or organization is communicably connected to the user's account in financial institution 130, with the user's prior agreement or permission.

In an embodiment, individual or organization wanting access to personal data packages 128 is a computing device such as a laptop, tablet, desktop personal computer, and smartphone, each of which can support a client application. The individual or organization wanting access to personal data packages device 128 can be a device that supports a web browser that connects to a server, such as platform 102. In an embodiment, device 128 is communicably connected, via communications network 114, to platform 102. In another embodiment, device 128 is communicably connected, via communications network 114, to the add-on product 120. The individual or organization device 128 accesses the storage 104 to obtain, or have transferred to them, the data of the personal data package stored therein. In an embodiment, the individual or organization device 128 obtains the data from many personal data packages of many users, as a type of data mart. This individual or organization 128 may want to aggregate the data from many users into buckets, such as for example, men between the ages of 20 and 30. As another example, the individual or organization 128 may be an advertising agency wanting to study browsing behavior and generate browsing trends that may be used in their advertising campaigns. It should be appreciated that the individual or organization 128 may obtain data from one or more personal data packages in real-time, as opposed to currently, where data is typically sold to advertisers in batches. The data in the batches may be stale as they are not updated in real-time. In contrast, the innovation is configured to improve upon third party entities (e.g., individual or organization 128) having access to a large amount of user data in real-time (e.g., via the data lake 104). That is, third party entities purchase valuable data from a number of collectors, but in bulk and in real-time.

In an embodiment, third-party subscribing to data lake 126 ("third-party subscriber 126) is a computing device such as a laptop, tablet, desktop personal computer, and smartphone, each of which can support a client application. The third-party subscriber 126 can be a device that supports a web browser that connects to a server, such as platform 102. In an embodiment, third-party subscriber 126 is communicably connected, via communications network 114, to platform 102. In another embodiment, third-party subscriber 128 is communicably connected, via communications network 114, to the add-on product 120. The third-party subscriber 128 accesses the storage 104 to obtain, or have transferred to them, the data of the personal data package stored therein. In an embodiment, the platform 102 or add-on product 120 is configured to allow the third-party subscriber 126 to have access to particular types of data. For instance, the third-party subscriber 126 may have access to the user's web data for a predetermined amount of time (e.g., 20-30 days). Other examples of the particular types of data may include but are not limited to being restricted to advertisement data, the location of the user, the web traffic of the user, and eye tracking data. In an embodiment, platform 102 or add-on product 120 is configured to allow third-party subscriber 126, such as a third-party advertising company, to data lake 104 that stores many personal data packages from many users. In one embodiment, many third-party subscribers 126 (e.g., many companies) can subscribe to the data (e.g., personal data packages) stored in data lake 104 at a standard rate. In another embodiment, a bidding model is provided in which third-party subscribers 126 (e.g., companies) can bid for a specific rate and/or a specific amount or level of access and only one third-party subscriber 126 wins the access. In another embodiment, the user (e.g., via device 116) puts up their data for bid in groups that are similar to the user (e.g., males between the ages of 30 and 40 years old). Then, the different companies (e.g., third-party subscribers 126) bid on that group of data or access to that group of data for a specific amount of time. Only one company (e.g., third-party subscribers 126) wins the bid.

In another embodiment, the platform 102 is configured to offer fluctuating pricing for the data. In an embodiment, platform 102 may be configured with a particular threshold of personal data packages. That is, if the number of personal data packages available or accessible to third-party subscriber 126 (or even individual or organization 128) is below a predetermined threshold amount, the price may be different from when such number is above the predetermined threshold amount. For instance, such threshold may indicate whether the use of the platform 102 (or add-on product 120) has reached a network effect level (e.g., for the data to be meaningful). For instance, if there aren't enough people using the platform 102 or the add-on product 120, then it is likely that third-party subscribers 126 or individual or organization 128 will not purchase the data. In another embodiment, for a certain kind of subscribed level of data the price might vary for how much is paid for access to it.

It should be appreciated that the third-party individual or organization (e.g., 126 and 128) may be an entity other than a company. For instance, such entity may be a hospital or organization performing medical research and the personal data packages include health-related data such as browsing for specific diseases, prognoses, or cures. Other different examples include the sports industry where an individual or organization may be searching for browsing activity related to sports injuries, improving sports performances, or sports equipment purchasing trends.

In an embodiment, web browser 118 includes an interface that is communicably connected to platform 102. In another embodiment, web browser 118 includes extension software or computer program and/or an add-on product for creating and/or processing personal data package 120. Also, web browser 118 includes a processor for monitoring, collecting, aggregating, and temporarily storing personal data (towards creating package thereof) and user profile ("monitoring, collecting, and aggregating processor") 122.

In an embodiment, monitoring, collecting, and aggregating processor 122 is a generic processor that captures data related to user browsing activities and browsing-related activities, such as for example eye tracking data. Such captured data, raw, reformatted, or aggregated, is transmitted by web browser 118 via communication network 114 to either the processor for generating the personal data package 103 or the storage 104 for purposes of being accessed by the processor for generating the personal data package 103 to generate the personal data package. In another embodiment, the extension or add-on product 120 processes the captured data and generates the corresponding personal data package. In an embodiment, extension or add-on product 120 includes or is communicably connected to a storage (e.g., 104) upon which to store the generated personal data package for post-processing. For example, web browser 118 is the Google browser (Alphabet Inc., Mountain View, CA) and add-on product 120 is added to or rides on top of the Google browser.

In an embodiment, platform 102 includes storage/lake for storing the personal data package 104; processor enabling (user) to control access to /transact/sell/monetize the personal data package 106; processor for processing subscriptions of the personal data package 108; processor for preventing resale of personal data package 110; processor for paying user for access to the package of personal data 112; and processor for generating personal data package 103.

In an embodiment, storage/lake for storing the personal data package 104 ("storage 104") is configured to store one or more personal data packages. Storage 104 is configured to be accessed by third-party subscribing to data lake 126; individual or organization wanting access to personal data packages 128; user device 116; and/or web browser 118. Storage 104 includes the appropriate identity security measures for allowing access. For example, storage 104 may be configured to allow user device 116 access only to personal data packages that correspond to the user or user device 116. As another example, storage 104 may be configured to allow access to a specific set of personal data packages to third party subscriber 126. In another embodiment, storage 104 is configured to allow certain levels of access based on a subscription, an amount paid, and other such criteria. In another embodiment, storage 104 is configured to scrub certain data from the personal data package, such as for example social security numbers that are found in the personal data packages.

In an embodiment, processor enabling (user) to control access to /transact/sell/monetize the personal data package 106 ("control access processor 106") is configured to allow the user, via user input, to designate controls on the data within the corresponding personal data package. For example, the user can be offered two or more levels of access to the data in the personal data package in exchange for two or more different payments. For instance, the user can select to only allow access to his or her location data. As another example, the user can select to allow access to the entire personal data package. In an embodiment, the user is paid more for permitted greater access to his or her data than when the user allows only a limited amount of access to his or her data. Further, control access processor 106 is configured to allow the user to transact, such as for example, to allow his or her data to be transferred to the other party's device, for a certain amount of payment. In an embodiment, access processor 106 is configured to allow the user to sell their data for a certain amount of payment. In another embodiment, access processor 106 is configured to allow the user to open their data for access for a certain amount of time. In an embodiment, access processor 106 is communicably connected with storage 104, so that storage 104 can be configured according to the user's control access criteria. For instance, if the user only allows access to their age, but not their gender, then such criteria is conveyed to storage 104 for when the corresponding personal data package is accessed in storage 104.

In an embodiment, processor for processing subscriptions of the personal data package 108 ("subscriptions processor 108") is configured to allow third-party subscriber 126 to subscribe to personal data packages as discussed in the discussion of third-party subscriber 126. In an embodiment, subscriptions processor 108 is communicably connected with storage 104, so that storage 104 can be configured according to the user's control access criteria. For instance, if the user only allows access to their age, but not their gender, then such criteria is conveyed to storage 104, such as third-party subscribers are only allowed access to that information and none other of the user's personal data package.

In an embodiment, processor for preventing resale of personal data package 110 ("preventing resale processor 110") is configured to prevent the resale of the personal data package. In an embodiment, the user transacting, selling, or monetizing the personal data package and the third-party subscriber 126 or third-party individual and organization 128 agree to terms of a contract that such personal data package will not be resold. In another embodiment, the preventing resale processor 110 or add-on product 120 add a digital lock to the personal data package before the third-party accesses the personal data package. An example of a digital lock is a file locking mechanism that restricts access to a computer file by allowing only one user or process to modify or delete it in a specific time and to prevent reading of the file while such file is being modified or deleted. It should be appreciated that preventing resale processor 110 is configured to employ generic file lock mechanisms.

In an embodiment, processor for paying user for access to the package of personal data 112 ("paying processor 112") is configured to receive informational data about which entities accessed the user's personal data package and the price for such access for each entity. Subsequently, the paying processor 112 computes the amount due to the user and informs (e.g., via physical letter, email, or SMS) the respective entities to pay the user (e.g., via check or auto-deposit at the user's account in financial institution 130).

In an embodiment, processor for generating personal data package 103 ("personal data package processor 103") is configured to receive the user's browsing and browsing-related data originating from monitoring, collecting, and aggregating processor 122 and compile such data into a predetermined form referred to herein as the personal data package. In an embodiment, the predetermined form is suitable for various components of the innovation. For instance, the predetermined form is suitable for the third-party entities 126 and 128 to read and process the data therein. Also, the predetermined form is suitable for the user, via the user device 116, to read their data in the personal data package. Further, the remaining components (e.g., 104, 106, 108, 110, 112, and 120) that may process the personal data package are configured to read the personal data package in the predetermined form. In an embodiment, the add-on product 120 includes or is communicably connected to personal data package processor 103.

Figure 2:
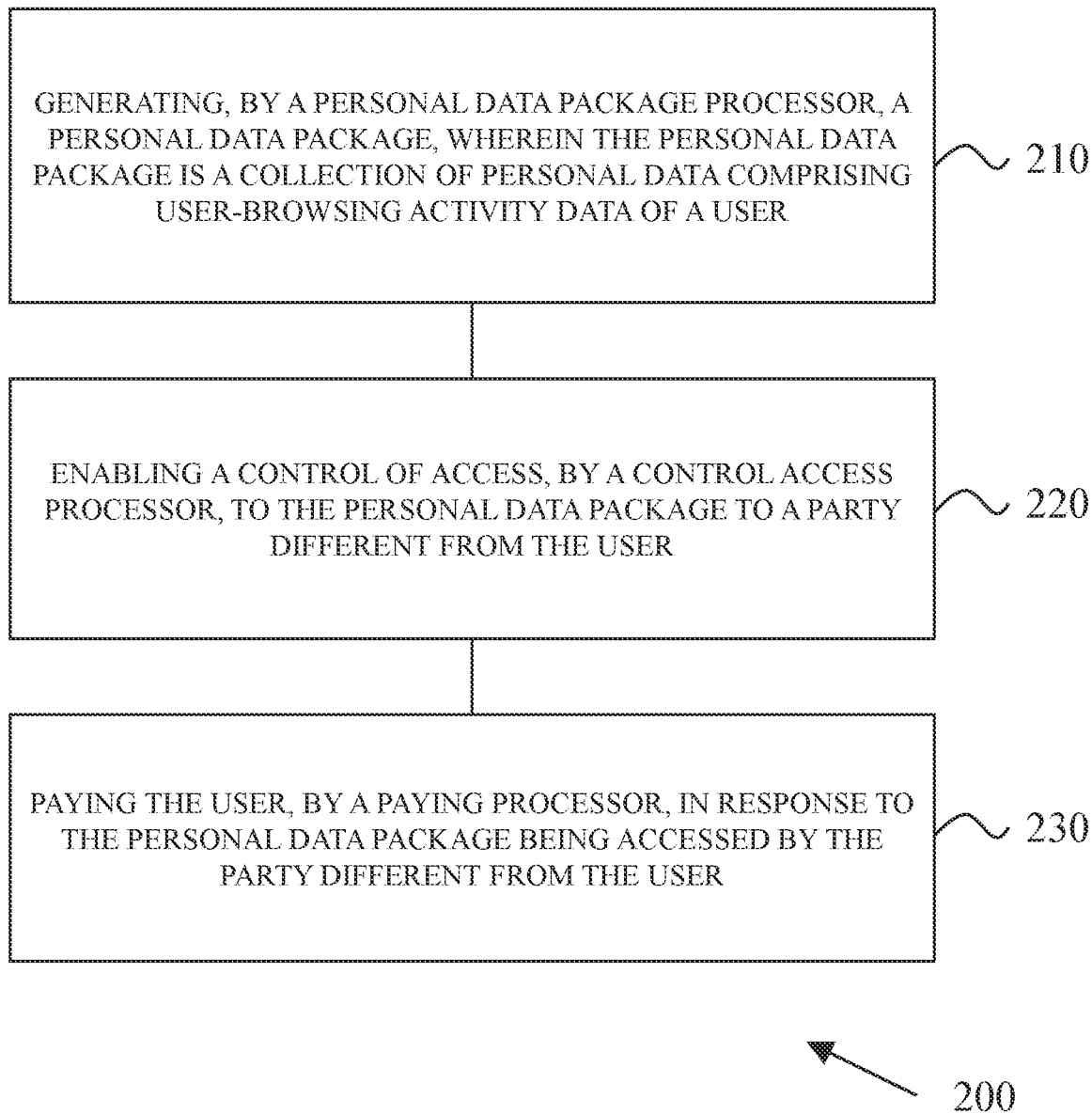
FIG. 2 a flowchart for paying a user for access to the user's personal data package, in accordance with an embodiment.

An embodiment can be understood with reference to FIG. 2, a flowchart for a method for paying a user for access to the user's personal data package. The method 200 includes, at step 210, generating, by a personal data package processor (e.g., 103 in FIG. 1), a personal data package (e.g., as stored in storage 104 in FIG. 1), wherein the personal data package is a collection of personal data comprising user-browsing activity data (e.g., by 122 in FIG. 1) of a user (e.g., FIG. 1, user device 116 accessing website(s) 124).

The method 200 includes, at step 220, enabling a control of access, by a control access processor (e.g., 106 of FIG. 1), to the personal data package (e.g., in storage 104 of FIG. 1) to a party different from the user (e.g., 126 and/or 128 of FIG. 1).

The method 200 includes, at step 230, paying the user (e.g., 116 of FIG. 1), by a paying processor (e.g., 112 of FIG. 1 and communicating with and using 130 of FIG. 1), in response to the personal data package (e.g., as stored in storage 104 of FIG. 1) being accessed by the party different from the user (e.g., 126 and/or 128 of FIG. 1).

An Example Machine Overview

Figure 3:
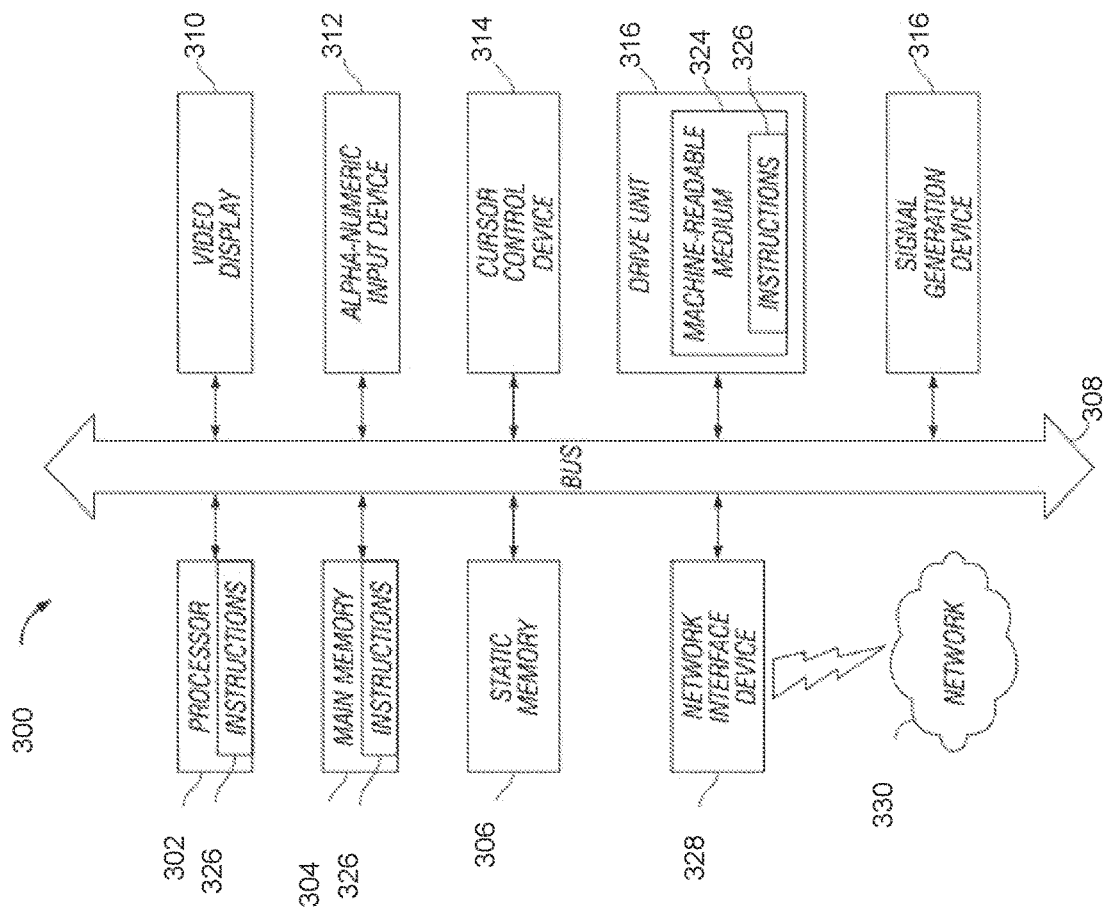
FIG. 3 is a block diagram of a processing system that can implement operations of the disclosed embodiments.

FIG. 3 is a block schematic diagram of a system in the exemplary form of a computer system 300 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 300 includes a processor 302, a main memory 304 and a static memory 306, which communicate with each other via a bus 308. The computer system 300 may further include a display unit 310, for example, a liquid crystal display (LCD) or a cathode ray tube (CRT). The computer system 300 also includes an alphanumeric input device 312, for example, a keyboard; a cursor control device 314, for example, a mouse; a disk drive unit 316, a signal generation device 318, for example, a speaker, and a network interface device 328.

The disk drive unit 316 includes a machine-readable medium 324 on which is stored a set of executable instructions, i.e. software, 326 embodying any one, or all, of the methodologies described herein below. The software 326 is also shown to reside, completely or at least partially, within the main memory 304 and/or within the processor 302. The software 326 may further be transmitted or received over a network 330 by means of a network interface device 328.

In contrast to the system 300 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to purchase a product within the video on such internet-enabled or other network-enabled devices, servers, or clients. It further should be appreciated that one or more cloud computing embodiments include purchasing within the video using mobile devices, tablets, and the like, as such devices are becoming standard consumer devices.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in the flow diagram discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the invention is described herein in terms of several embodiments, one skilled in the art will readily appreciate that other applications may be substituted for those set forth herein without departing from the spirit and scope of the present invention. Accordingly, the invention should only be limited by the claims included below.

I claim:

1. A network-accessible platform, comprising:
   a personal data package processor configured to generate a personal data package, wherein the personal data package is a collection of personal data comprising user-browsing activity data of a user;
   a control access processor configured to enable the user to control real-time access to the personal data package to a party different from the user,
      wherein the real-time access includes
         a first user-selected access level to a first type of user data of the personal data package for a first cost, and
         a second user-selected access level to a second type of user data of the personal data package for a second cost, wherein the first cost is different from the second cost based on a threshold amount of the first type of user data being available or accessible to the party different than the user;
   a contract to which the user and party different from the user agree, said contract indicating that the personal data package cannot be resold by the party different from the user;
   a preventing resale processor configured to prevent a resale of the personal data package based on the contract; and
   a paying processor configured to pay the user in response to the personal data package being accessed in real-time by the party different from the user.

2. The network-accessible platform of claim 1, wherein the control access processor is further configured to enable the user to perform operations of transact, sell, or monetize the personal data package.

3. The network-accessible platform of claim 1, wherein the personal data package processor is further configured to monitor, collect, aggregate, and cause to store the personal data of the user for the purpose of generating the personal data package.

4. The network-accessible platform of claim 1, further comprising:
   a data lake storage for storing the personal data package, wherein the data lake storage is configured to be subscribed to by a third-party organization for access to the personal data package; and
   a subscriptions processor configured to process a subscription to the personal data package stored in the data lake storage, the subscription for a predetermined length of time.

5. The network-accessible platform of claim 4, wherein the subscriptions processor is further configured to:
   allow a plurality of organizations to subscribe at a predetermined rate;
   allow a bidding plurality of organizations to bid for a particular rate and an amount of access to the personal data package and award access to only one of the bidding plurality of organizations; or
   offer fluctuating pricing for different types of access to the personal data package.

6. The network-accessible platform of claim 1, wherein the user-browsing activity data comprises any of or any combination of:
   web traffic caused by the user;
   advertisements viewed;
   location of the user; or
   eye-tracking data.

7. The network-accessible platform of claim 1, wherein the first type of user data is eye-tracking data, wherein the second type of data is location data.

8. A method, comprising:
   generating, by a personal data package processor, a personal data package, wherein the personal data package is a collection of personal data comprising user-browsing activity data of a user;
   enabling, by a control access processor, real-time access to the personal data package to a party different from the user,
      wherein the real-time access includes
         a first user-selected access level to a first type of user data of the personal data package for a first cost, and
         a second user-selected access level to a second type of user data of the personal data package for a second cost, wherein the first cost is different from the second cost based on a threshold amount of the first type of user data being available or accessible to the party different than the user;
   providing a contract to which the user and party different from the user agree, said contract indicating that the personal data package cannot be resold by the party different from the user;
   preventing, by a preventing resale processor, a resale of the personal data package based on the contract by adding a digital lock to the personal data package before the party different from the user accesses the personal data package; and
   paying the user, by a paying processor, in response to the personal data package being accessed in real-time by the party different from the user.

9. The method of claim 8, wherein enabling the real-time access further comprises enabling the user to perform operations of transact, sell, or monetize the personal data package.

10. The method of claim 8, wherein generating the personal data package further comprises monitoring, collecting, aggregating, and causing to store the personal data of the user for the purpose of generating the personal data package.

11. The method of claim 8, further comprising:
    storing, in a data lake storage for storing the personal data package, wherein the data lake storage is configured to be subscribed to by a third-party organization for access to the personal data package; and
    processing, by a subscriptions processor, a subscription to the personal data package stored in the data lake storage, the subscription for a predetermined length of time.

12. The method of claim 11, wherein processing the subscription further comprises:
    allowing a plurality of organizations to subscribe at a predetermined rate;
    allowing a bidding plurality of organizations to bid for a particular rate and an amount of access to the personal data package and awarding access to only one of the bidding plurality of organizations; or
    offering fluctuating pricing for different types of access to the personal data package.

13. The method of claim 8, wherein the user-browsing activity data comprises any of or any combination of:
    web traffic caused by the user;
    advertisements viewed;
    location of the user; or
    eye-tracking data.

14. A system, comprising:
    a personal data package processor configured to generate a personal data package, wherein the personal data package is a collection of personal data comprising user-browsing activity data of a user;
    a control access processor configured to enable the user to control real-time access to the personal data package to a party different from the user,
       wherein the real-time access includes
          a first user-selected access level to a first type of user data of the personal data package for a first cost, and
          a second user-selected access level to a second type of user data of the personal data package for a second cost, wherein the first cost is different from the second cost based on a threshold amount of the first type of user data being available or accessible to the party different than the user;
    a contract to which the user and party different from the user agree, said contract indicating that the personal data package cannot be resold by the party different from the user;
    a preventing resale processor configured to prevent a resale of the personal data package based on the contract by adding a digital lock to the personal data package before the party different from the user accesses the personal data package;
    a paying processor configured to pay the user in response to the personal data package being accessed in real-time by the party different from the user; and
    an ancillary product, wherein the ancillary product is a computer program added to a web application or web browser,
       wherein the web application or web browser is communicably connected to the personal data package processor, the control access processor, the preventing resale processor, and the paying processor, and
       wherein the ancillary product is configured to allow the user to control real-time access to the personal data package and to receive payment for providing real-time access to the personal data package to the party different from the user.

15. The system of claim 14, wherein the control access processor is further configured to enable the user to perform operations of transact, sell, or monetize the personal data package.

16. The system of claim 14, wherein the personal data package processor is further configured to monitor, collect, aggregate, and cause to store the personal data of the user for the purpose of generating the personal data package.

17. The system of claim 14, wherein the web application or the web browser is communicably connected to a data lake storage for storing the personal data package, wherein the data lake storage is configured to be subscribed to by a third-party organization for access to the personal data package; and
    further comprising a subscriptions processor configured to process a subscription to the personal data package stored in the data lake storage, the subscription for a predetermined length of time, and wherein the web application or web browser is communicably connected to the subscriptions processor.

18. The system of claim 14, wherein the user-browsing activity data comprises any of or any combination of:
- web traffic caused by the user;
- advertisements viewed;
- location of the user; or
- eye-tracking data.

* * * * *